March 12, 1929.  M. N. STATES  1,705,315
EDUCATIONAL APPARATUS
Filed May 12, 1927
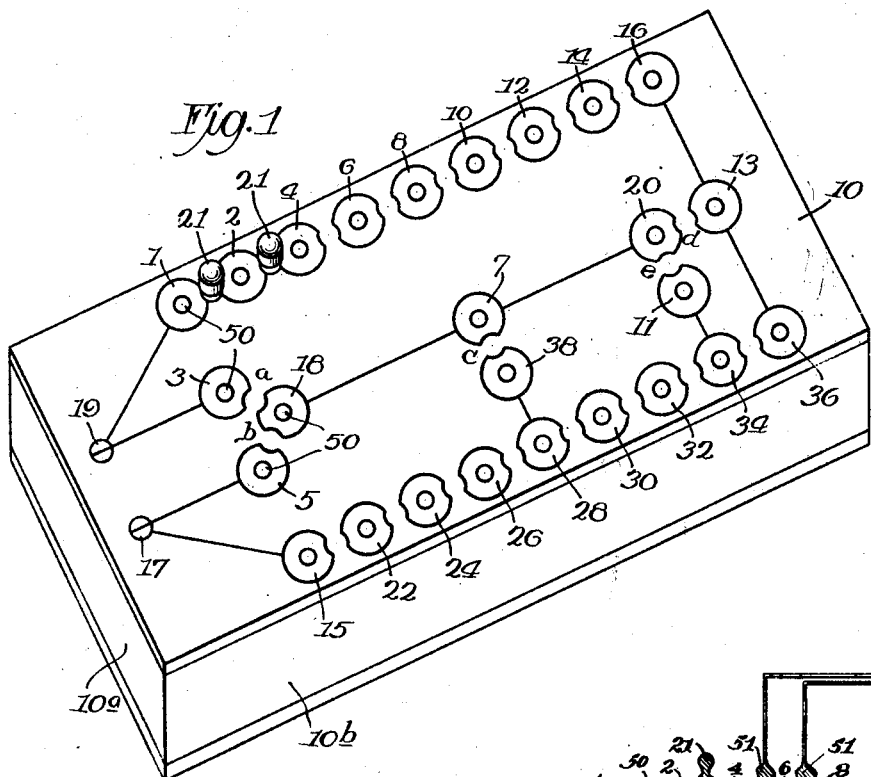
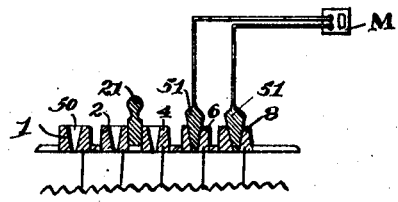
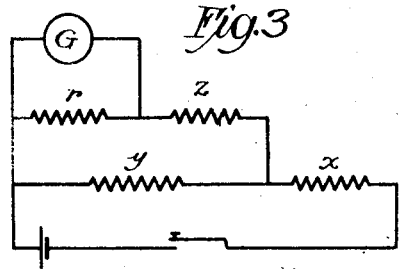
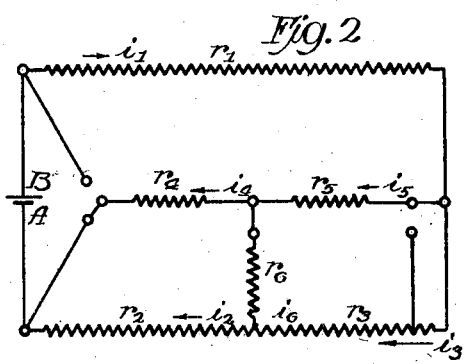
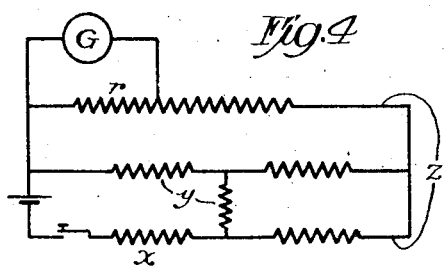
Inventor
Marshall N. States
By Wilson, Mann & Cox,
Attys.

Patented Mar. 12, 1929.

1,705,315

UNITED STATES PATENT OFFICE.

MARSHALL N. STATES, OF LEXINGTON, KENTUCKY.

EDUCATIONAL APPARATUS.

Application filed May 12, 1927. Serial No. 190,797.

This invention relates to educational devices, and has for its principal object to provide apparatus that will facilitate the demonstration of Kirchhoff's laws, which may be stated as follows:

In a network of circuits in which direct current is flowing the algebraic sum of currents meeting at a junction of conductors is zero, the currents approaching and leaving the junction, respectively, being given the opposite signs.

In a network of circuits in which direct current is flowing, for any given closed mesh of the network the algebraic sum of the electromotive forces is equal to the algebraic sum of the products of each resistance and corresponding current; currents and electromotive forces in one direction being given the opposite sign from those in the opposite direction.

The preferred embodiment of the invention is illustrated in the accompanying drawings, in which Fig. 1 is a somewhat diagrammatic view showing a known type of resistance box supplemented with resistance elements and switches in accordance with this invention;

Figure 1ª shows a fragmentary vertical section through a portion of the resistance box and a measuring instrument connected thereto.

Fig. 2 is a wiring diagram illustrating a connection that will permit Kirchhoff's laws to be demonstrated by elementary students, and Figs. 3 and 4 are wiring diagrams of alternative connections to permit figure of merit determination.

Referring to Fig. 1, 10 indicates the top of a box having sides 10ᵇ, ends 10ª. Secured to the top of the box are lugs 2, 4, 6, 8, 10, 12, 14, 16, 18, 20, 22, 24, 26, 28, 30, 32, 34, 36, 38, each of which carries a spool equipped with a resistance coil and connections after the conventional manner of making resistance boxes; also secured to the top of the box are other lugs 1, 3, 5, 7, 11, 13 and 15. Near one end there are also provided binding posts 17 and 19.

The resistance values of the coils connected with the even numbered lugs 2 to 16 inclusive are 1, 2, 3, 4, 10, 20, 30 and 40 ohms, respectively.

The resistance values of the coils connected with the lugs 18, 20 and 38 are each 100 ohms.

The resistance values of the coils connected with the even numbered lugs 22 and 36 inclusive, are 4000, 3000, 2000, 1000, 400, 300, 200 and 100 ohms, respectively.

A suitable number of plugs 21 are provided for establishing connection between the adjacent lugs and thereby shunting the corresponding resistance in the well understood manner, and it will be clear that any other type of switch may be used without departing from the spirit of the invention.

From the foregoing it will be apparent that the upper and lower rows of lugs in Fig. 1, together with the binding posts 17 and 19, and the appropriate connections, correspond to a known type of resistance box; and to this have been added a plurality of resistance elements and auxiliary connections making it possible to obtain a considerable variety of three mesh circuits. In other words, the added elements and connections permit the original resistance elements and the additional elements to be combined in a network of conductors of known resistance.

Referring to Fig. 1ª, M represents a measuring instrument which may be connected to the resistance box by means of terminal plugs 51, 51 which are inserted in the sockets 50, 50.

In the strictest sense of the word, the apparatus is not a bridge, but for the want of a better nomenclature it may be called Kirchhoff's bridge.

The circuit used in the diagram in Fig. 2 is in form the same as a Wheatstone bridge where $r_6$ corresponds to the resistance of the galvanometer and $r_1$ a resistance in the mesh containing the E. M. F.

For the circuit illustrated in Fig. 2 the following equations are immediately derived from Kirchhoff's laws. In writing the equations the internal resistance of the battery is assumed to be a negligible quantity in comparison with the other resistances of the circuit.

$$\begin{aligned} i_1 r_1 + (i_1 - i_3) r_5 + (i_1 - i_2) r_4 &= E \\ i_2 r_2 - (i_1 - i_2) r_4 - (i_3 - i_2) r_6 &= O \quad (1) \\ i_3 r_3 + (i_3 - i_2) r_6 - (i_1 - i_3) r_5 &= O \end{aligned}$$

Since the E. M. F. in two of the meshes is equal to zero, the solution of these equations for the currents offers the student a simple yet excellent exercise in determinants. Assuming values of $r_1$, $r_4$, $r_5$, and $r_6$ to be equal to 100 ohms each, $r_3 = 400$, and $r_2$ equal to 1000 ohms, the above expressions for the currents reduce to:

$i_1 = 3.68\ E$ ma.   (ma. = milliamperes)
$i_2 = .36\ E$ ma.   (2)
$i_3 = .67\ E$ Using a battery of 9 or 10 volts E. M. F. it appears from Eq. (2) that these currents as well as $(i_1-i_2)$, $(i_1-i_3)$ and $(i_3-i_2)$ are of the order of a few milliamperes, and that the drops in potential across the various resistances are a volt or two. The computed values of the currents $(i-i_2)$ $(i_1-i_3)$ and $(i_3-i_2)$, the interpretations of which usually offer the beginner difficulty, are checked by inserting a milliammeter of negligible resistance in the circuit at the proper places.

Travelling plugs attached to the milliammeter and inserted in the lugs 5 and 18, 7 and 38, 20 and 13 or 20 and 11, may be used for making these observations. To permit this each of the lugs is provided with tapered sockets 50 to receive complemental portions of the travelling plugs.

To avoid the introduction of a fourth mesh, the drops in potential across the various resistances may be verified by the condenser and discharge key method, the condensers being connected across each resistance by travelling plugs inserted in the corresponding sockets 50, and being discharged through a ballistic galvanometer, the reading of which is proportional to the charging voltage.

With a milliammeter of range 0 to 50 ma. and a ballistic galvanometer of approximately 50 megohms sensitivity, the student can compare computed and observed values of the currents and potential drops across the resistances to within 1.5 per cent or less.

The resistances $r_4$, $r_5$, and $r_6$ have fixed values of 100 ohms each. The resistances $r_1, r_2,$ and $r_3$ may take on various values. In fact, in all, there are 240 different circuits available in which all of the resistances are multiples of 100 ohms. Of this large number, more than 100 are suitable for laboratory exercises. Hence, in large laboratory sections repetition of assignments is made unnecessary. Furthermore, the general solutions of Eq. (1) furnish the instructor a quick check on the student's work.

*Bridge connections for figure of merit determination.*

By arrangements of the bridge as in Figs. 3 and 4, the figure of merit of a galvanometer may be quickly obtained. All of the plugs are removed from the bridge except two. These plugs are at points in the circuit, ($a$ and $c$, Fig. 1, or in mesh, $y$, Fig. 3), where contact resistance of the plugs would be of negligible significance. It is obvious, therefore, that extraneous resistance is practically eliminated, for the values of $x=10,000$ ohms, $y=200$ ohms, $r+z=1,110$ ohms, and $r=1, 2, 3 \ldots$ depending upon the resistance and sensitivity of the galvanometer.

With this arrangement the figure of merit, $F$, is given by $$F = \frac{r.E.\ 10^{-7}}{\phi[(G+r)13.322 - .0102r^2]}\ \text{amp.} \quad (3)$$

where $r$ is the resistance across which the galvanometer of resistance $G$ is shunted to produce a deflection of $\phi$ radians. The E. M. F. in the circuit is $E$. Without appreciable error the last term in the denominator may be neglected and Eq. (3) reduces to the simple and convenient form:

$$F = \frac{r.E.7.5\ .10^{-9}}{\phi(G+r)}\ \text{amp.} \quad (4)$$

A similar equation also applies to Fig. 4.

A thorough trial of the apparatus in laboratory sections of college physics in one of the large universities has proven that the apparatus was of considerable value to both the teacher and the student.

I claim as my invention:

1. In an apparatus of the type including resistance elements, electrical measuring means and switches arranged to permit resistance values up to the sum of all in steps of the smallest unit, the combination with a plurality of additional resistance elements and auxiliary connections arranged to permit the original resistance elements and the additional elements to be combined in a network of conductors of known resistance whereby Kirchhoff's laws may be verified.

2. In an apparatus of the type including resistance elements, electrical measuring means and switches arranged to permit resistance values up to the sum of all in steps of the smallest unit, the combination with a plurality of additional resistance elements and auxiliary connections arranged to permit the original resistance elements and the additional elements to be combined in a network of conductors of known resistance and travelling switches connected to said measuring means and adapted to be associated with the network at the junctures whereby the fall of potential in a selected branch of the net work may be directly measured.

3. In an apparatus of the type including resistance elements, electrical measuring means and switches arranged to permit resistance values up to the sum of all in steps of the smallest unit, the combination with a plurality of additional resistance elements and auxiliary connections arranged to permit the original resistance elements and the additional elements to be combined in a network of conductors of known resistance, and travelling switches connected to said measuring menas and adapted to be associated with the resistance of a branch of the network to permit measurement of current in that branch.

4. In an apparatus of the class described, a plurality of resistance units, current and voltage measuring instruments, connections between certain of the units and switches permitting the formation of a network of meshes which are composed of resistances of known values, and means for connecting the current measuring instrument into each mesh, and means for connecting the voltage measuring instrument across each resistance.

5. In an apparatus of the class described, groups of resistance elements of known values, each group being connected in series, means for connecting the groups in series, means for shunting out selected resistance elements, auxiliary resistance elements of known value and means for selectively connecting the auxiliary resistance elements, and elements of the groups in meshes forming a network, measuring instruments and means for connecting measuring instruments in series with and across the resistance element.

6. In an apparatus of the class described, two rows of resistance elements connected in series and having the elements of each row connected in series, means for shunting out selected resistance elements, auxiliary resistance elements, between the rows and means for selectively connecting the auxiliary resistance elements, and the resistance elements in the rows in meshes forming networks of circuits, measuring instruments and means for connecting said measuring instruments in series with and across the resistance elements.

In testimony whereof I affix my signature.

MARSHALL N. STATES.